July 30, 1929.　　　　J. C. LINCOLN　　　　1,722,929
FLUX HOLDER
Original Filed Jan. 29, 1920
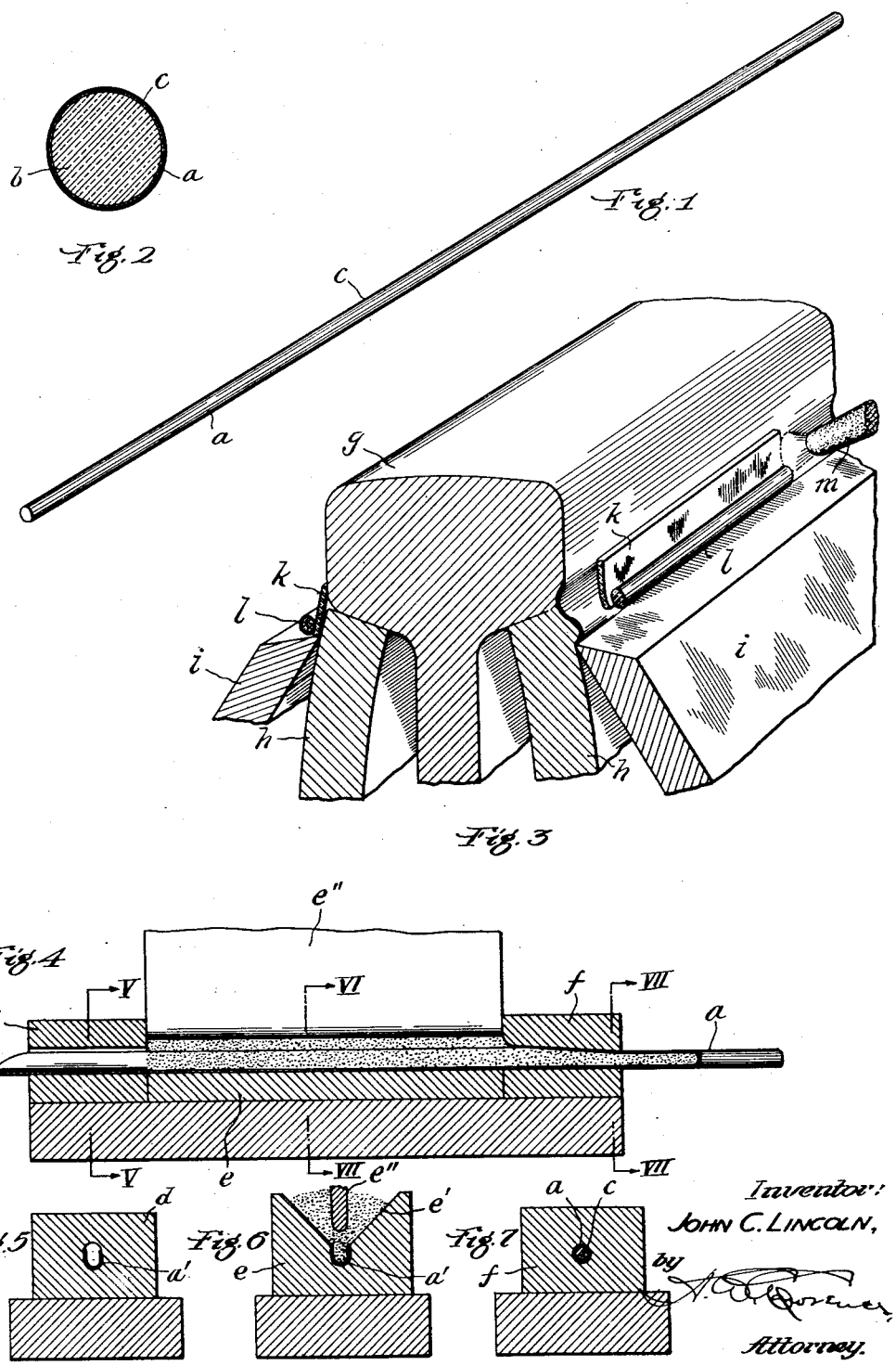
Inventor:
JOHN C. LINCOLN,
by
Attorney.

Patented July 30, 1929.

1,722,929

UNITED STATES PATENT OFFICE.

JOHN C. LINCOLN, OF EAST CLEVELAND, OHIO, ASSIGNOR TO THE CITIZENS SAVINGS AND TRUST COMPANY, OF CLEVELAND, OHIO, A CORPORATION OF OHIO.

FLUX HOLDER.

Application filed January 29, 1920, Serial No. 354,950. Renewed June 8, 1928.

My invention relates to a new article of manufacture, comprising a flux holder for carrying and positioning a charge of suitable fluxing material for welding operations; the object of my invention being to provide a body of such fluxing material which may be positioned along the line of the proposed weld, of known quantity and which will adequately protect the molten metal of said weld without a chance for dissipation or loss. I am aware that strips of solder and of brazing metal, with associated charges of some fluxing material have been previously suggested in that branch of the art, with which the present invention, relating solely to welding operations, should not be confused. The semi-permanent flux holder of fibre or metal herein set forth is provided with a definite charge of the desired flux, and this charge is protected from disintegration or atmospheric change by an air-excluding envelope, either exteriorly or interiorly of the holder. Preferably a carbonate is employed as a flux, which melts in order to cover the molten metal under the welding flame, and also evolves an inert atmosphere about said frame and metal.

In welding operations, particularly in the open air, there is always a tendency to displace the ordinary flux, which usually is applied in powdered form, while it requires unusual care and some experience, properly to distribute such powdered flux along the line of the weld. Thus, the welding flame or arc, supplemented by external drafts, constantly tends to displace and blow away any powdered flux previously applied to the line of welding. As a result, the molten metal is not adequately or evenly protected, and the resulting weld frequently is of unsatisfactory and undependable character.

Accordingly, I have solved the difficulties ordinarily encountered in applying a flux for welding, by providing a suitable, semi-permanent holder which is supplied with a definite charge of solid fluxing material and preferably coated with a protective covering. As a principal ingredient, I may compound the fluxing material with sodium carbonate or I may use it alone; the desired quality thereof being its marked tendency to spread and cover the metal of the weld when in molten condition. I may combine therewith other suitable materials, such as calcium carbonate or resin, which are dissipated by the welding flame to produce an inert atmosphere about said flame and molten metal, whereby further to protect the weld and avoid a brittle structure otherwise likely to result.

My invention may best be described in connection with the accompanying drawings, wherein:

Fig. 1 is a plan view of a tubular flux holder embodying said invention.

Fig. 2 is an enlarged cross-sectional view of the foregoing.

Fig. 3 is a fragmentary cross-sectional view of a railway rail and fish plates which are in process of being electrically welded with the aid of my flux holder.

Fig. 4 is a longitudinal sectional view, and Figs. 5, 6 and 7 are transverse sectional views on corresponding lines; all somewhat diagrammatic in character, illustrating one means for making a tubular flux holder.

Throughout the several figures of the drawings I have employed the same character of reference to indicate similar parts.

Essentially the new article of manufacture comprises a holder or container carrying a definite charge of fluxing material, of which a large proportion preferably possesses the quality of high capilarity. The flux is in solid form so that it may not be displaced by the drafts and gases attendant upon the use of a welding flame. As thus far employed, the charge has been applied either interiorly or exteriorly of a metallic holder, and it has been protected by a suitable covering, as of resin.

The holder of Figs. 1 and 2 comprises a tube of thin sheet metal $a$ which is interiorly packed with a solid fluxing material $b$ and the whole is coated with a protective, impervious covering $c$ to avoid any deterioration or action of the air thereon. Thus, sodium carbonate above mentioned, is subject to slow efflorescence, as are other fluxing agents, and this is counteracted by a thin covering $c$ of resin, applied by dipping the treated holder in a substantially saturated mixture of wood alcohol and resin.

A convenient mode of manufacturing this tubular holder is shown in Figs. 4 to 7, wherein the thin, flat wire $a'$ is passed intermittently in turn through a die-block $d$ imparting thereto a U-shape; through a packer $e$ and finally through a die-block $f$ which completes the tube. The packer $e$ has a hopper portion $e'$ filled with the fluxing material or mixture, and a ram $e''$ serves intermittently as depressed within the hopper, to fill the U-shaped casing with the flux, as indicated in Fig. 6. This explanation is given by way of example only, since the holder may be made in any desired manner.

The sodium carbonate desirably may be combined or mixed with other materials, as with borax, fine sand, calcium carbonate, resin or other suitable hydrocarbon. These latter suffer disintegration at a low heat and serve to generate an inert, protective atmosphere about the welding flame and the molten metal. One simple mixture which I have found advantageous in rail welding comprises two parts of sodium carbonate, one part of resin and one part wood alcohol; the resin acting both as a protector and binder for the carbonate. In addition, the application of the resin in solution to the sodium carbonate serves to coat the particles thereof each substantially in a protective resinous envelope, thus preventing efflorescence.

The holder may be a roll or tube of other material than metal, such as fiber or compressed paper, for example. Its office is that of retaining, protecting and positioning the fluxing material until it is subjected in position to the welding flame. The metal, in part, is vaporized as is any other semi-permanent holder, although some of the metal is certain to become a part of the weld itself, if a steel or alloyed wire is used. Indeed, the metal container or holder, which ordinarily is preferable, affords a ready means for introducing a definite amount of alloying material to the welded seam.

For the purpose of explaining the use of my improved flux holder, I have illustrated in Fig. 3 the process of electrically welding rail ends between their embracing fish plates. The rail $g$ has terminally engaging fish plates $h$; the upper right hand edges being in process of welding. A copper bar $i$ is positioned along the line of the proposed weld, but beneath it, while a strip of metal $k$ and a flux holder $l$ of the type already described are disposed immediately adjacent to the line of welding. Preferably, the negative carbon electrode $m$ is employed to advance an electric arc along the line of the proposed weld, which rapidly melts the adjacent surfaces of the rail and fish plate, the metal $k$ and the flux holder within its welding flame. The flux, due to its high capilarity, spreads in molten condition over the surface of the melted metal and protects it from atmospheric action. This is observable, much as oil will spread over a surface of water, even though the parts are practically in vertical position, as instanced.

It will be readily understood that the semi-permanent tube or holder serves to retain the flux in desired quantities properly positioned with respect to the arc and welded seam, until the holder is melted or consumed. Thus, the flux is not liable to dissipation or loss, as where a powdered material is relied upon.

Having now described the preferred embodiment and composition of my invention, I claim as new and desire to secure by Letters Patent, together with such modifications as may be made by those merely skilled in the art, the following:

1. As a new article of manufacture, a flux holder for welding operations, comprising a semi-permanent holder member, a predetermined charge of solid fluxing material carried thereby, and an air-excluding protective envelope for the flux intermixed and incorporated therewith, substantially as set forth.

2. As a new article of manufacture, a flux holder for welding operations, comprising a semi-permanent container, a predetermined charge of solid fluxing material of which the bulk is carbonate of sodium, and an air-excluding envelope for the flux intermixed and incorporated therewith, substantially as set forth.

3. As a new article of manufacture, a flux holder for welding operations, comprising an elongated tubular member substantially the length of the proposed weld, an enclosed charge comprising essentially sodium carbonate, the particles of which are provided with a protective coating, and a resinous envelope applied to the exterior of the tubular member, substantially as set forth.

4. As a new article of manufacture, a thin, elongated, sheet metal shell and a charge of fluxing material including sodium carbonate and surrounding resinous material contained therein, substantially as set forth.

5. As a new article of manufacture, a fluxing tube for welding, comprising a thin, elongated, metal shell, a charge of fluxing material including sodium carbonate contained therein, the particles of said carbonate having a protective resinous envelope, and a protective covering for the tube and flux, substantially as set forth.

6. As a new article of manufacture, a fluxing tube for welding operations, comprising a thin, sheet metal tube, a charge of sodium carbonate contained therein in solid form, the particles of which are enclosed in a protective envelope, and a resinous coating for the exterior of said tube, substantially as set forth.

7. In a flux holder for welding operations, a thin cylindrical ferrous shell substantially the length of the proposed weld, a definite charge of fluxing agent including sodium carbonate distributed throughout said shell, the particles of which are enclosed in resinous envelopes, and means for excluding the air from said fluxing agent.

8. A flux holder for welding operations, comprising a thin semi-permanent shell substantially the length of the proposed weld, and a charge of fluxing material filling the interior of said shell, comprising sodium carbonate incorporated and enclosed within a resinous envelope as to the individual particles, substantially as set forth.

In testimony whereof I do now affix my signature.

JOHN C. LINCOLN.